(12) United States Patent
Yukitomo et al.

(10) Patent No.: US 6,191,736 B1
(45) Date of Patent: Feb. 20, 2001

(54) DATA COMMUNICATION APPARATUS AND DATA COMMUNICATION METHOD

(75) Inventors: Hideki Yukitomo, Yokohama; Kazuyuki Miya, Kawasaki; Katsuhiko Hiramatsu, Yokosuka; Keiji Takakusaki, Yokohama, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/208,860

(22) Filed: Dec. 10, 1998

(30) Foreign Application Priority Data

Dec. 16, 1997 (JP) .................................................... 9-363616

(51) Int. Cl.[7] ................................. G01S 3/16; G01S 3/28
(52) U.S. Cl. ............................................. 342/383; 342/380
(58) Field of Search ..................................... 342/383, 380

(56) References Cited

U.S. PATENT DOCUMENTS

| 5,218,359 | * | 6/1993 | Minamisono | 342/383 |
| 5,369,412 | * | 11/1994 | Tsujimoto | 342/380 |
| 5,966,095 | * | 10/1999 | Hiramatsu et al. | 342/383 |

FOREIGN PATENT DOCUMENTS 63-149904   6/1998   (JP) .

OTHER PUBLICATIONS

An English Language abstract of JP 63-149904.

* cited by examiner

*Primary Examiner*—Theodore M. Blum
(74) *Attorney, Agent, or Firm*—Greenblum & Bernstein, P.L.C.

(57) ABSTRACT

Received signal provided via plural antennas 101 are memorized in memory 102. First weight controller 103 calculates the first weights by which the received signals are weighted, and second weight controller 104 calculates the second weights using the received signals. Multipliers 107 and 108 multiply the memorized received signals by the first weights, while multiply the memorized received signals by the second weights when a channel quality of radio signals deteriorates due to a change of the radio signal's direction of arrival Adder 109 synthesizes the multiplication results. Propagation path distortion compensator 110 estimates a deterioration of the channel quality using synthesis result to compensate. Detector 111 detects the compensation result that is used as a parameter to calculate the first and second weights, which allows the apparatus to receive radio signals without deteriorating reception qualities when the channel quality deteriorates rapidly due to the change of the radio signal's direction of arrival.

31 Claims, 8 Drawing Sheets

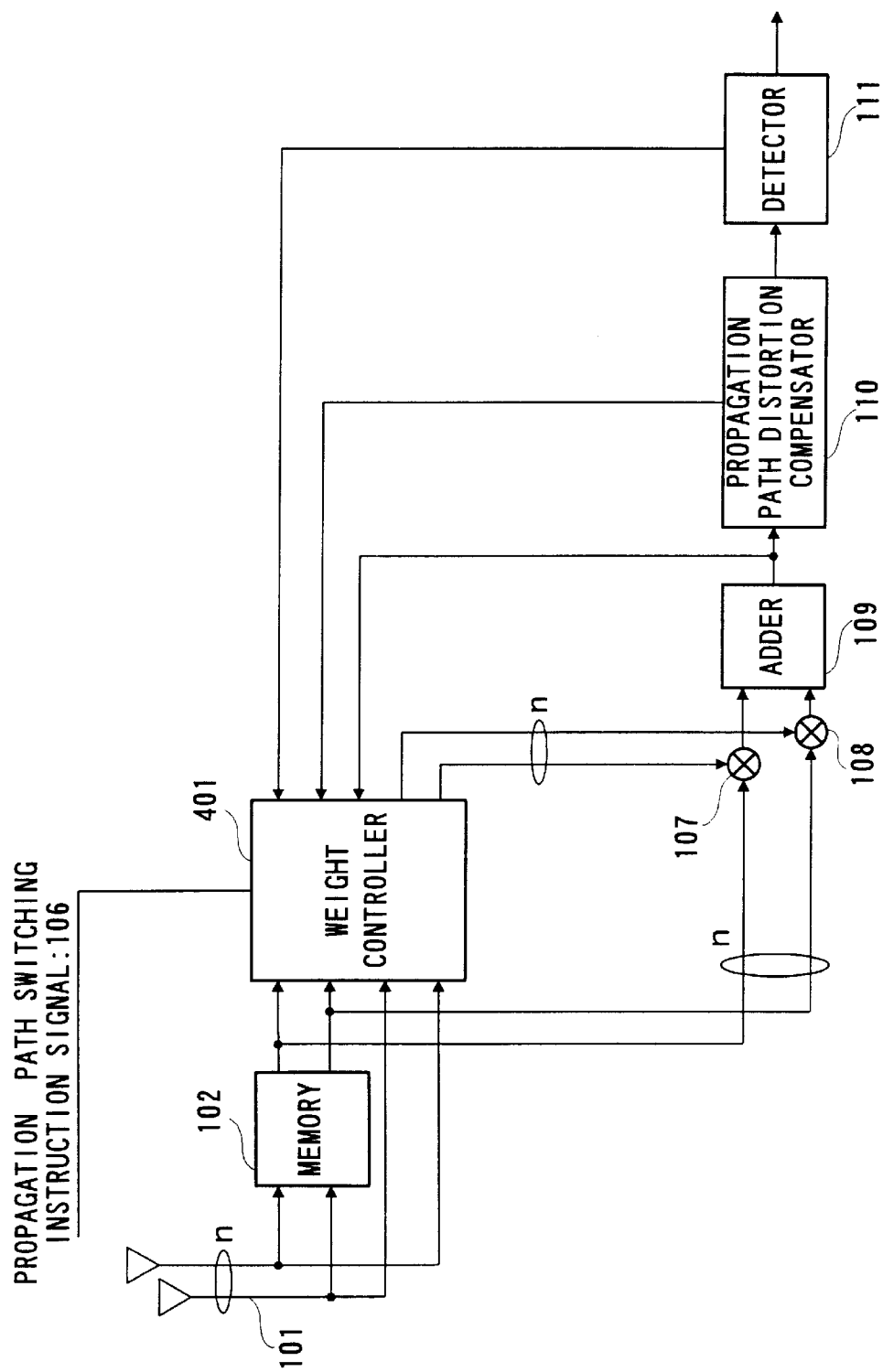
F I G. 5

DATA COMMUNICATION APPARATUS AND DATA COMMUNICATION METHOD

BACKGROUND OF THE INVENTION

1. Field of the Invention

The present invention relates to a data communication apparatus and data communication method used in a digital radio communication system using a CDMA (Code Division Multiple Access) system and so on.

2. Description of the Related Art

Conventionally, in a data communication method, a plurality of received signals provided from a plurality of antennas are synthesized by multiplying each received signal by weights. This processing forms the reception directivity and suppresses unnecessary signals to prevent reception performance from deteriorating.

As a configuration of such antennas, there is an adaptive array antenna apparatus. Since the adaptive array antenna apparatus has a function to cancel an affect of multi-path fading and so on, it can reduce a communication performance deterioration caused by interference and multi-path propagation in radio signal environments of mobile communications. As the number of antennas in the adaptive array antenna, 2 to 10 antennas are usually applied, however 2 to more than 1,000 antennas are sometimes applied.

FIG. 1 is a block diagram illustrating a configuration of a conventional data communication apparatus. In FIG. 1, signals received at plural antennas 1 are subjected to a predetermined radio reception processing, then input to weight controller 2 and multipliers 3 and 4.

Weight controller 2 calculates weights, by which the plurality of signals received at plural antennas 1 are weighted, corresponding to electric field intensities and the phase of received signals and outputs the calculated weights to multipliers 3 and 4. In addition, directions from which radio signals are transmitted, i.e., the radio signal's direction of arrival are estimated by calculating the weights.

Multipliers 3 and 4 multiply the received signals by the weights. Adder 5 adds the multiplication results in multipliers 3 and 4 and outputs the addition result to propagation path distortion compensator 6.

Propagation path distortion compensator 6 estimates a radio signal distortion caused in a propagation path using the addition results, compensates the estimated distortion, and outputs the received signals subjected to the distortion compensation to weight controller 2 and detector 7.

Detector 7 detects the received signals subjected to the distortion compensation and outputs the detected results as received signals to a received signal processing circuit (not shown), while outputs weights to synthesize the received signals provided via plural antennas 1 to weight controller 2 to update a parameter of weight controller 2.

However, in the above conventional data communication apparatus, in the case where a channel quality deteriorates by a rapid change of the radio signal's direction of arrival and so on, other antenna synthesis weights are calculated. At this time, the channel quality deteriorates when a value obtained before the radio signal is switched is used because incoming directions of arrival are different. Hence, weight controller 2 can not use the value obtained before the radio signal is switched as an initial value. Therefore an initial synthesis of received signals after the radio signal is switched should be performed without directivity. Hence desired radio signals are affected by interference signals of the same channel transmitted from different directions, thereby deteriorating the reception performance.

SUMMARY OF THE INVENTION

An object of the present invention is to provide a data communication apparatus and data communication method capable of receiving radio signals without deterioration of reception performance even in the case where an radio signal's direction of arrival changes rapidly.

This object is achieved by a data communication apparatus comprising plural antennas, a memory section for memorizing received signals provided via the plural antennas, a first weight control section, using the memorized received signals, for calculating first weights by which the received signals provided via the plural antennas are weighted to synthesize, a second weight control section for calculating second weights using the received signals provided via the plural antennas, a multiplying section for multiplying the memorized received signals by the first weights, while multiplying the memorized received signals by the second weights when a channel quality of radio signals deteriorates, an adding section for synthesizing the multiplication result, a compensating section for estimating a deterioration of the channel quality of radio signals using the synthesis result to compensate, and a detecting section for detecting the compensation result to output as a parameter to calculate the first and second coefficients to the first and second weight control sections.

BRIEF DESCRIPTION OF THE DRAWINGS

FIG. 5 is a block diagram illustrating a configuration of a data communication apparatus according to the second and third embodiments of the present invention;

DETAILED DESCRIPTION OF THE PREFERRED EMBODIMENTS

The embodiments of a data communication apparatus and a data communication method are explained below with reference to attached drawings.

First Embodiment

Figure 1:
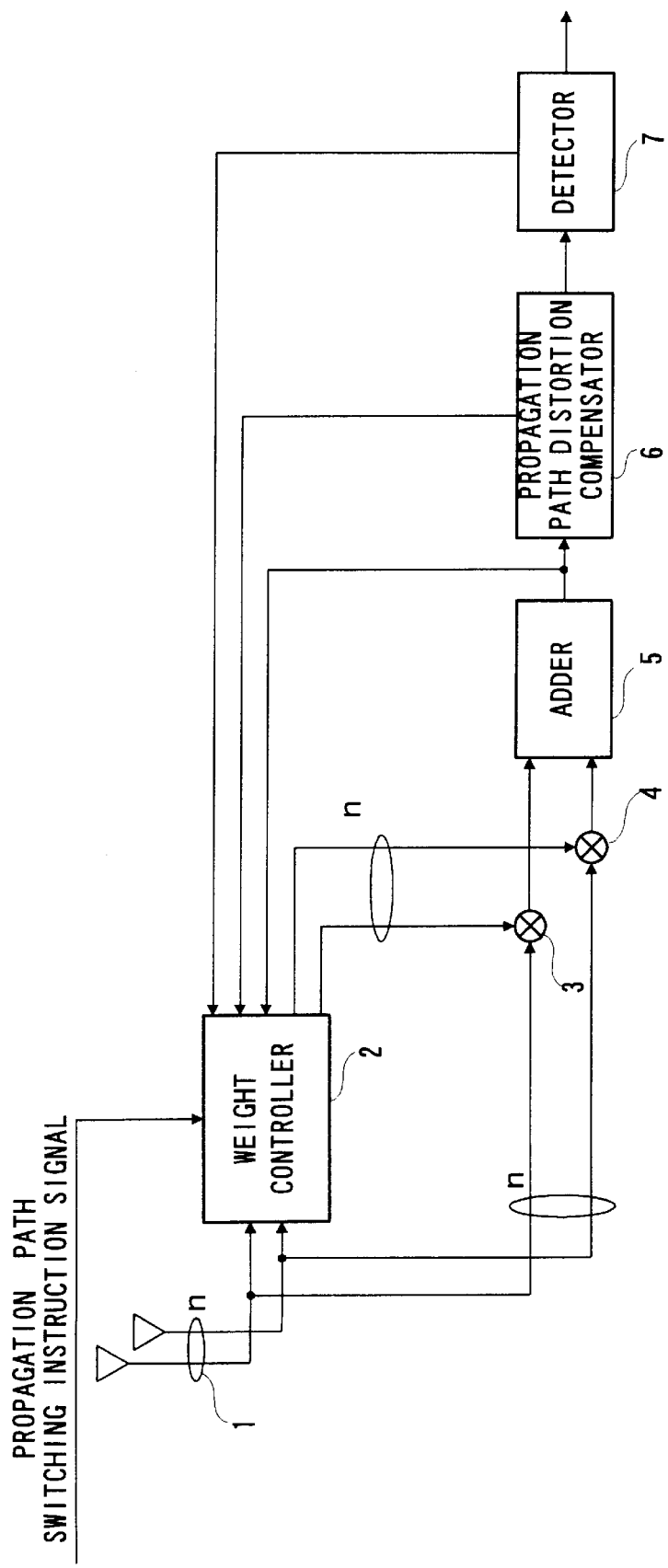
FIG. 1 is a block diagram illustrating a configuration of a conventional data communication apparatus.
Figure 2:
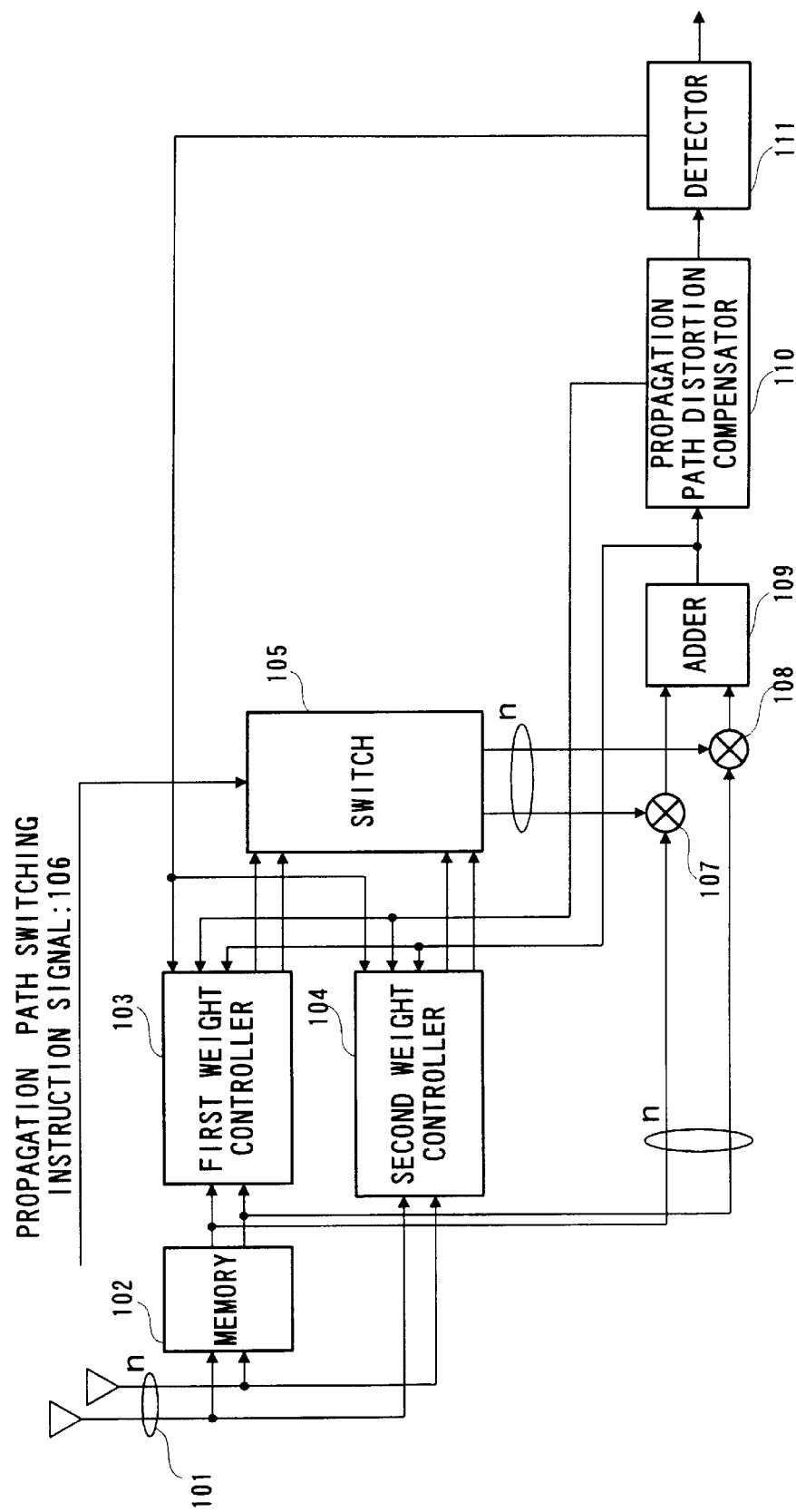
FIG. 2 is a block diagram illustrating a configuration of a data communication apparatus according to the first embodiment of the present invention.

FIG. 2 is a block diagram illustrating a configuration of a data communication apparatus according to the first embodiment of the present invention of the present invention. In FIG. 2, plural antennas 101 composed of n numbers of antennas are to receive incoming radio signals. Memory 102 is to memorize received signals provided via plural antennas 101, for example, FIFO (First In First Out) memory is used.

First weight controller 103 calculates weights, using previous received signals at plural antennas 101 (for example, one slot before) memorized in memory 102, corresponding to electric field intensities and the phase of received signals.

Second weight controller 104 calculates optimal weights for the received signals provided via plural antennas 101 that are memorized in memory 102, using current received signals at plural antennas 101 when propagation path switching instruction signal 106 is input.

Switch 105 switches first and second weight controllers 103 and 104 corresponding to propagation path switching instruction signal 106. Multipliers 107 and 108 multiply the received signals output from memory 102 by the weights obtained in first weight controller 103 or second weight controller 104, where the weights are input via switch 105.

Adder 109 adds the multiplication results of multipliers 107 and 108, and outputs the addition result to first and second weight controllers 103, 104 and propagation path distortion compensator 110.

Propagation path distortion compensator 110 estimates a radio signal distortion caused in the propagation path using the addition results, compensates the estimated distortion, and outputs the received signals subjected to the distortion compensation to weight controllers 103, 104 and detector 111.

Detector 111 detects the received signals subjected to the distortion compensation and outputs the detected results as received signals to a received signal processing circuit (not shown), while outputs the detection result to first and second weight controllers 103 and 104 as a parameter to update weights.

In the constitution described above, the signals received at plural antennas 101 are once memorized in memory 102 then output to first weight controller 103. The weights, by which the received signal is weighted, output from memory 102 is thus calculated. In this case, switch 105 selects first weights controller 103 according to propagation path switching instruction signal 106.

By this selection, the weights obtained in first weight controller 103 input via switch 105 is multiplied by the received signal output from memory 102 in multipliers 107 and 108. The multiplication results are added in adder 109, then the addition result is output to the first and second weight controllers 103, 104 and propagation path distortions compensator 110.

Hereinafter, the processing of propagation path distortion compensator 110 is explained with reference to its configuration illustrated in FIG. 3. Propagation path distortion estimation circuit 201 estimates a propagation path distortion of the addition result using the pilot signals in or envelop information, and outputs the estimated propagation path distortion to propagation path distortion compensation circuit 202, and first weight controller 103 and second weight controller 104.

Propagation path distortion compensation circuit 202 compensates the propagation path distortion estimated by propagation path distortion estimation circuit 201 to output to detector 111. Detector 111 detects the compensated received signal and outputs the detection result as the received signal to a received signal processing circuit (not shown), while outputs the detection result to first and second weight controllers 103 and 104 as a parameter to update the weights. At this time, it is preferable to output a signal of propagation path distortion compensation output from propagation path distortion compensator 110 to the received signal processing circuit to improve error correction performance.

At this time, first weight controller 103 performs the estimation of incoming direction based on pervious slot information because the received signal to be subjected to the estimation was once memorized in memory 102.

For example, in the case where signals are received at plural antennas 101 according to the order of Slot 300, Slot 301, Slot 302 and Slot 303, one slot of them is memorized in memory 102 according to the order. It is preferable that memory 102 has a memory capacity of plurality of slots.

In this case, at the time when antenna 101 receives Slot 301, first weight controller 103 has already calculated the weights based on information on Slot 300 memorized in memory 102. At this time, multipliers 107 and 108 multiply the received signals output from memory 102 by the weights calculated based on Slot 300.

It is assumed that the channel quality deteriorates by a rapid change of radio signal's direction of arrival and so on at the reception time of Slot 302. Then propagation path switching instruction signal 106 is input to switch 105 from the external. At this time, the channel quality is obtained by measuring SNR (Signal to Noise Ratio), reception power, etc. Accordingly it is possible to obtain propagation path switching instruction signal 106 from the external when the radio signal's direction of arrival is changed rapidly.

In other words, switch 105 to which propagation path switching instruction signal 106 is input performs the switching to connect second weight controller 104 to multipliers 107 and 108. And second weight controller 104 calculates the weights from Slot 302, while first weight controller 103 concurrently calculates the weights from Slot 301 memorized in memory 102.

At this time, since second weight controller 104 can obtain the content of Slot 302 earlier than first weight controller 103, second weight controller 104 calculates the weights on Slot 302 earlier than first weights controller 103.

Thus, at the reception time of Slot 303, multipliers 107 and 108 multiply Slot 302 output from memory 102 by the weights obtained in second weight controller 104 based on Slot 302, and adder 109 adds the multiplication results.

Further, at the reception time of Slot 303, switch 105 switches to first weight controller 103 again. It is otherwise preferable to perform the switching by next propagation path switching instruction signal 106.

At the time of this switching, first weight controller 103 uses the weights calculated by second weights controller 104. First weight controller 103 calculates the weights again with respect to Slot 302, and updates the weights continuously with respect to the following receptions.

Meanwhile, in the case where switching has not been performed until next propagation path switching instruction signal 106 is input, first weight controller 103 continues to update the weights using the weights in second weight controller 104.

In addition, it is preferable for saving power consumption that to stop an operation of first weight controller 103 or second weight controller 104 that is not necessary to operate, or until next propagation path switching instruction signal 106 is input from the external.

In the case where the channel quality deteriorates by a rapid change of the radio signal's direction of arrival and so on, it is thus possible in the first embodiment that to calculate in advance in second weight controller 104 the weights to be used after the radio signal's direction of arrival is changed, before the addition of multiplication results of received singles provided via plural antennas by the weights to synthesize the received signals, thereby making it possible to receive radio signals without deteriorating the reception property even in the case where the channel quality deteriorates rapidly.

In addition, it is designed to operate either of first weight controller 103 or second weight controller 104 that is necessary when an usual state or when the radio signal's direction of arrival changes rapidly, thereby saving power consumption.

Second Embodiment

FIG. 5 is a block diagram illustrating a configuration of a data communication apparatus according to the second embodiment. In addition, some sections in the second embodiment illustrated in FIG. 5 are assigned the same symbols as those of corresponding sections in the first embodiment illustrated in FIG. 2 and its explanation is omitted.

The different configuration of data communication apparatuses between in the first embodiment illustrated in FIG. 2 and the second embodiment illustrated in FIG. 5 is that first weight controller 103, second first weight controller 104, and switch 105 illustrated in FIG. 2 are replaced with a weight controller composed of one circuit that is indicated by 401 in FIG. 5.

Figure 4:
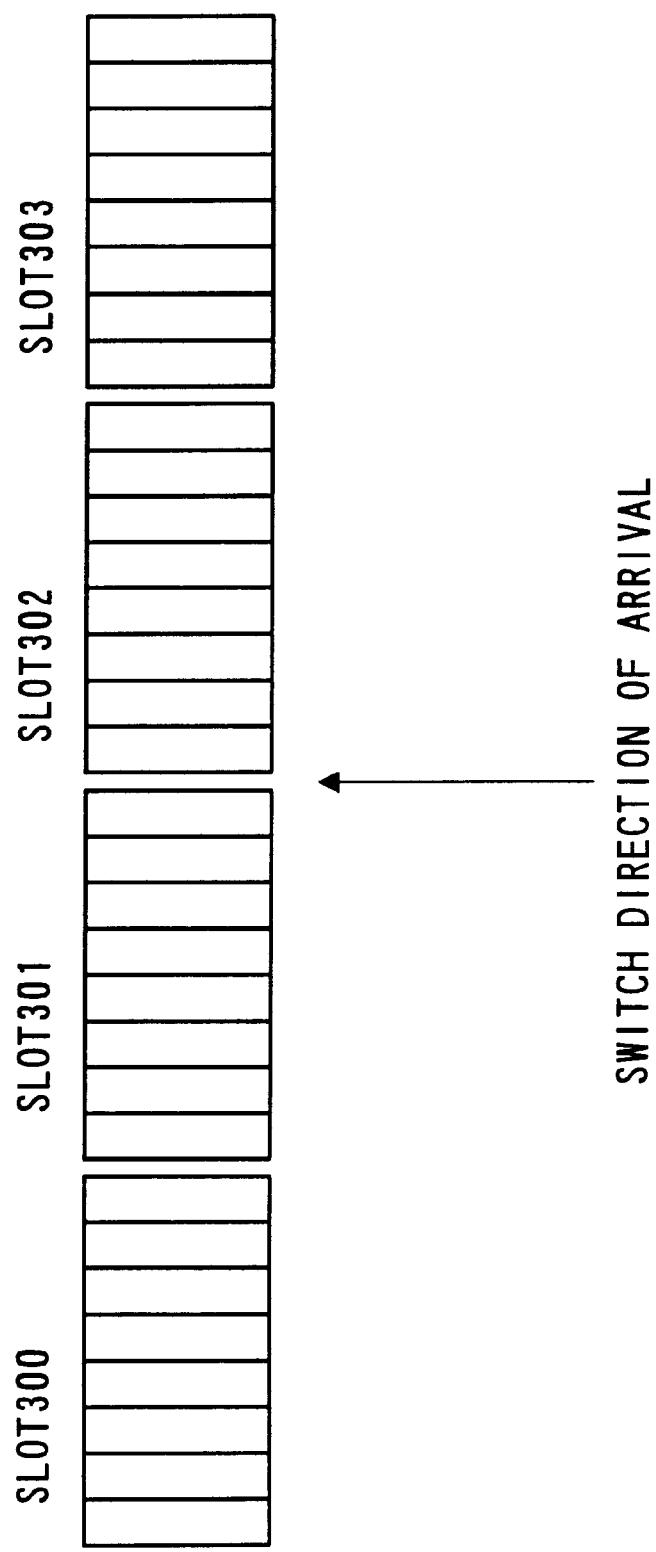
FIG. 4 is a diagram illustrating a slot configuration of received signals provided via plural antennas.

In this configuration, as illustrated in FIG. 4, at the time of receiving Slot 301, since received signals are once memorized in memory 302, weight controller 401 calculates weights based on information of a previous slot, i.e., Slot 300.

For example, in the constitution where a memory capacity of memory 102 is for one slot, at the time Slot 301 is input to memory 102, weight controller 401 controls the weights based on the information of Slot 300 and multipliers 107, 108 and adder 109 also multiply Slot 301 by the weights generated based on Slot 300.

In the case where a radio signal's incoming direction changes rapidly at the time of receiving Slot 302, propagation path switching instruction signal 106 is input to weight controller 401 from the external. At this time, weight controller 401 does not update the weights using information of Slot 301 memorized in memory 102, and outputs the weights (fixed value) calculated based on Slot 300 that is the previous one to multipliers 107 and 108.

During the period, weight controller 401 calculates the weights using information of Slot 302 input from plural antennas 101 directly not via memory 102, and outputs the weights calculated using the information of Slot 302 input from plural antennas 101 directly to multiplies 107 and 108.

It is thus possible in the second embodiment to obtain the same effect as the first embodiment. It is also possible to downsize a circuit configuration as compared to the first embodiment because the first and second weight controllers and the switch are integrated into one circuit (weight controller 401) that responds to the case of a rapid change of the radio signal's incoming direction.

Third Embodiment

This embodiment is explained with reference to FIG. 5 as well as the second embodiment.

When propagation path switching instruction signal 106 is input from the external, weight controller 401 performs concurrently the calculations of the weights on a received signal of a previous slot (one slot before) memorized in memory 102 and the calculation of the weights on a received signal of a current slot.

In the case where it is judged that further calculation ability is available, weight controller 401 calculates each weights on the received signal memorized in memory 102 and on the received signal provided via plural antennas 101, in the same manner as the case where propagation path switching instruction signal 106 is not generated.

In the case where it is judged that further calculation ability is not available, the estimation accuracy in each slot is decreased. For example, the weights on the previous received signal is calculated in the first half of a slot, and the weights on the current received signal is calculated in the latter half of the slot.

It is thus possible, as well as the second embodiment, to downsize a circuit configuration as compared to the first embodiment because the first and second weight controllers and the switch are integrated into one circuit (weight controller 401) that responds to the case of a rapid change of the radio signal's incoming direction.

Further according to this constitution, it is possible to calculate the weights using both the received signals memorized in memory 102 and the received signal provided via plural antennas corresponding to the availability of calculation ability. In this manner, in the case where the radio signal's incoming direction is changed rapidly, weight controller 401 can calculate the weights using the received signal memorized in memory 102 to output to multipliers 107 and 108, while calculates the weights using the received signal directly provided from plural antennas 101. It is thus possible in multipliers 107 and 108 to multiply received signals provided via plural antennas 101 by the weights obtained from a received signal closer to the current signal than that in the second embodiment.

Fourth Embodiment

Figure 6:
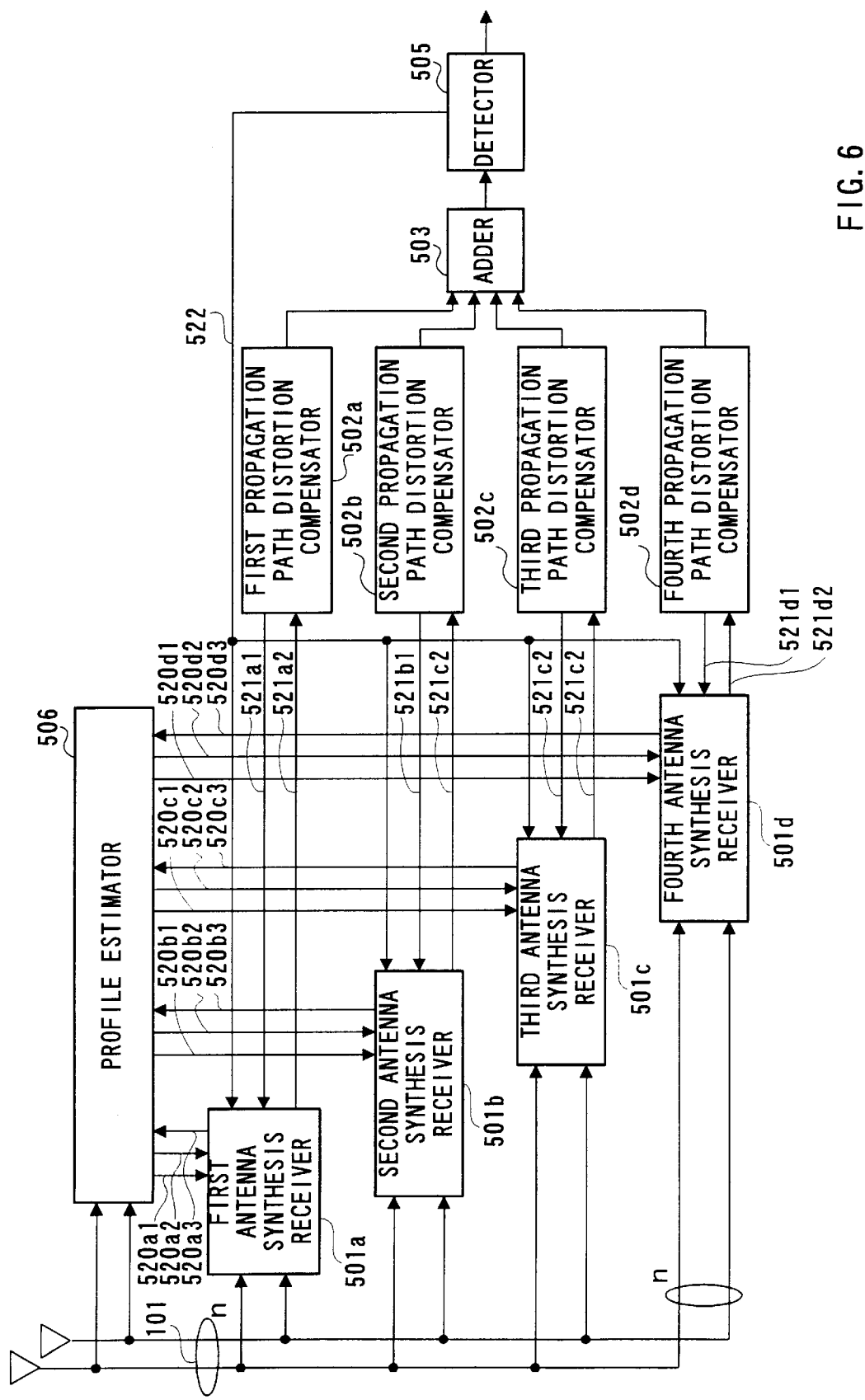
FIG. 6 is a block diagram illustrating a configuration of a data communication apparatus according to the fourth embodiment of the present invention.

FIG. 6 illustrates a block diagram of a data communication apparatus according to the fourth embodiment of the present invention. In addition, some sections in the fourth embodiment illustrated in FIG. 6 are assigned the same symbols as those of corresponding sections in the first embodiment illustrated in FIG. 2 and its explanation is omitted.

Figure 7:
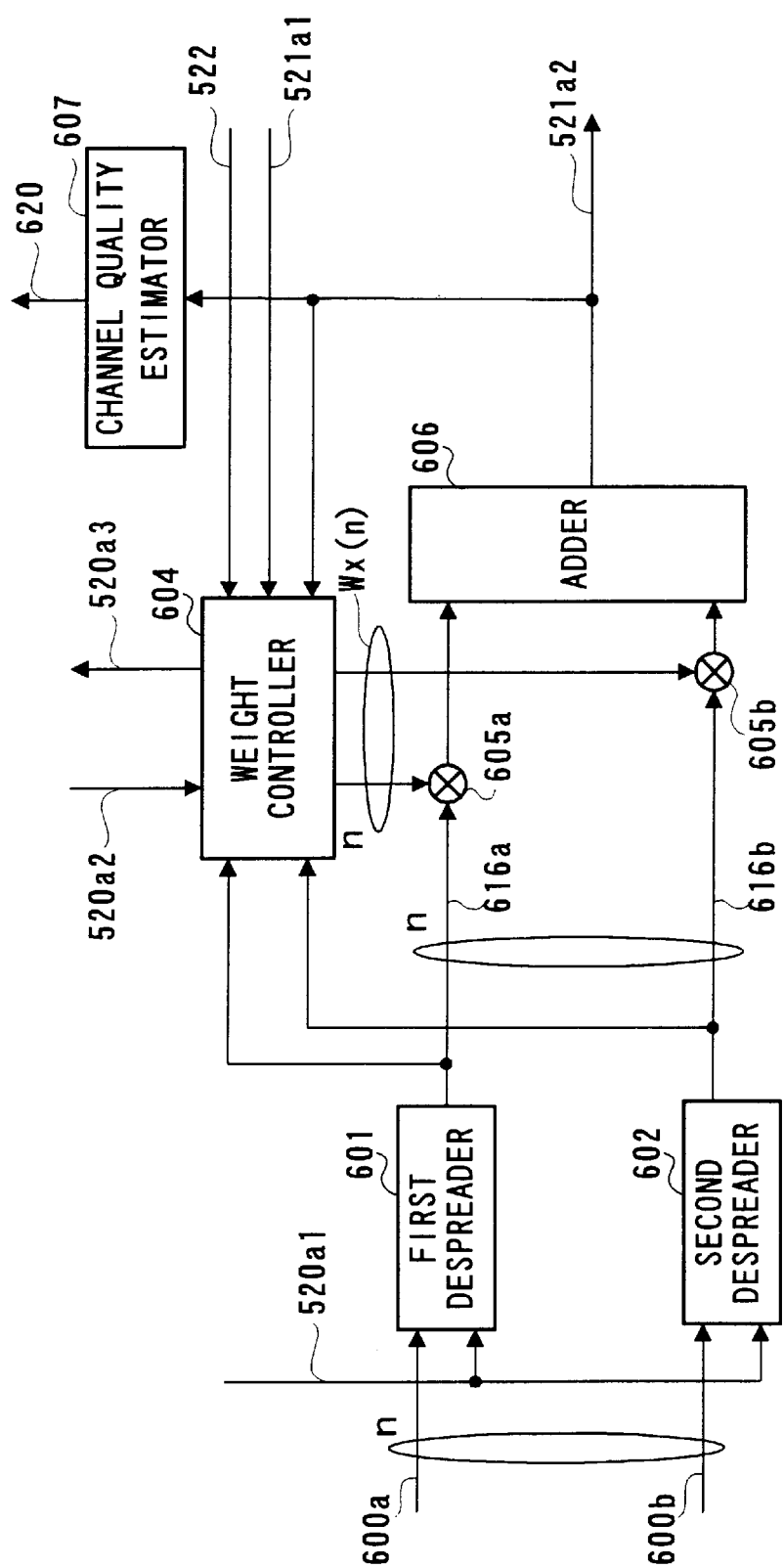
FIG. 7 is a block diagram illustrating a configuration of an antenna synthesis receiver in the data communication apparatus according to the fourth and fifth embodiments of the present invention.

FIG. 7 is a block diagram illustrating a configuration of the data communication apparatus to explain the fourth embodiment of the present invention.

The data communication apparatus in FIG. 7 is primarily composed of plural antennas 101, the first to the fourth antenna synthesis receivers 501a, 501b, 501c and 501d respectively, the first to the fourth propagation path distortion compensators 502a, 502b, 502c and 502d respectively, adder 503, detector 505 and profile estimator 606.

First to fourth antenna synthesis receivers 501a to 501d have the same internal configurations. Hence the internal configuration is explained with reference to first antenna synthesis receiver 501a using FIG. 7.

First antenna synthesis receiver 501a is composed of the first to the nth despreaders (in this case, three) 601, 602 and 603, weight controller 604, multipliers 605a, 605b and 605c, channel quality estimator 607 and adder 606. However any number of antennas in 101 is available, the same number of despreaders as that of antennas in 101 is necessary.

Despreaders 601 and 602 despread received signals provided from plural antennas 600*a* and 600*b* corresponding to timing signal 520*a*1 provided from profile estimator 506.

Weight controller 604 receives detection signal 522 output from detection circuit 505, channel distortion information 521*a*1 estimated by first propagation path distortion compensator 502*a*, synthesized signal 521*a* 2 output from adder 606, output signals 616*a* and 616*b* from the first to the nth despreaders (in this case, two) 601 and 602 and weights 502*a*2 output from profile estimator 506. Based on those received signals, weight controller 604 updates weights Wx (n) to multiply the outputs from despreaders 601 and 602. The update is, for example, in the case of using LMS algorithm, performed according to Equation (1) below, $$Wx(n)=Wx(n-1)+\mu G(n-1)e^* \quad (1)$$

where, $\mu$:step factor, G: output signals 616*a* and 616*b* from the first to the n-th despreaders 601 and 602, n:processing time and e*:conjugate complex.

Herein, e is an error such as noise component, and given by e=x×y−Z, where x:detected signal 522, y: channel distortion information 521*a*1 and z:synthesis signal.

Weights W (x) thus calculated is input to multipliers 605*a* and 605*b*, while output to profile estimator 606 as illustrated by arrow 520*a*3.

Multipliers 605*a*, 605*b* multiply output signals 616*a* and 616*b* respectively from despreaders 601 and 602 by weights Wx (n) to output to adder 606. Adder 606 adds output signals from multipliers 605*a* and 605*b* to generate synthesis signal 521*a*2 and outputs synthesis signal 521*a*2 to weight controller 604, channel quality estimator 607 and first propagation distortion compensator 502*a*.

Channel quality estimator 607 determines the channel quality of synthesis signal 521*a*2 output from adder 606 and outputs the estimated channel quality information 620 to the external. However in the case where channel quality information 620 is not used in the external, it is preferable to eliminate channel quality estimator 606.

As the number of antenna synthesis receivers for performing the above processing, four is applied in this embodiment, i.e., the first to the fourth antenna synthesis receivers 501*a* to 501*d*. However it is preferable to apply any number of antenna synthesis receivers that is more or less than 4.

In addition, first to fourth propagation path distortion estimators 502*a* to 502*d* have the same configurations illustrated in FIG. 6 as well as in the first and second embodiment. Therefor the configuration is explained below with reference to first propagation distortion compensator 502*a*. First propagation path distortion compensator 502*a* is composed of propagation path estimation circuit 201 and propagation path distortion compensation circuit 202. Propagation path distortion estimation circuit 201 estimates a propagation path distortion in output signal 521*a*2 from first antenna synthesis receiver 501*a*.

Propagation path distortion compensation circuit 202 compensates the propagation path distortion estimated by propagation path distortion estimation circuit 201 and outputs the compensation result to adder 503, while returns the prorogation distortion to first antenna synthesis receiver 501*a* as 521*a*1.

Adder 503 adds (synthesizes) the compensation results output from first to fourth propagation path distortion compensators 502*a* to 502*d* to output to detector 505. Detector 505 detects the synthesis result in adder 503 and outputs the detection result to a received signal processing circuit (not shown), while outputs the detection result to first to fourth antenna synthesis receivers 501*a* to 501*d* as information for update of antenna weights. At this time, the output signal from 503 may be input directly to the received signal processing circuit to improve error correction performance.

Profile estimator 506 calculates despreading timing data 520*a*1, 520*b*1, 520*c*1 and 520*d*1 for first to n-th antenna synthesis receivers 501*a* to 502*d* by estimating radio signal's incoming timing based on the received signals provided via plural antennas 101 to output to each antenna synthesis receivers 501*a* to 501*d*.

Profile estimator 506 receives weights 520*a*3, 520*b*3, 520*c*3 and 520*d*3 to be provided to the antenna received signals of antenna synthesis receivers 501*a* to 501*d* respectively from antenna synthesis receivers 501*a* to 501*d*. Profile estimator 506 outputs either of the received weights 520*a*3 to 520*d*3 to corresponding either of antenna synthesis receivers 501*a* to 501*d* as an initial value (weights 520*a*2 to 520*d*2) according to despreading timing.

For example, profile estimator 506 outputs the weights with the optimal despreading timing, which is selected from weights 520*b*3, 520*c*3 and 520*d*3 received from second to fourth antenna synthesis receivers 501*b* to 501*d*, to first antenna synthesis receiver 501*a* as weights 520*a*2.

The above processing is explained in detail below. In the case where a propagation path is changed, profile estimator 506 changes the despreading timing of either of antenna synthesis receivers 501*a* to 501*d* in which the propagation path is changed. When any of antenna synthesis receivers 501*a* to 501*d* perform despreading at the despreading timing close to the changed despreading timing, the weighing coefficient to be provided to the any of antenna synthesis receivers 501*a* to 501*d* is decided as the initial value. Profile estimator 506 instructs to antenna synthesis receivers 501*a* to 501*d* to update the weights using that initial value.

For example, in the case where a level of the radio signals that synthesis receiver 501*a* has received attenuates rapidly, profile estimator 506 detects newly other radio signals and instructs despreading timing 520*a*1 to antenna synthesis receiver 501*a* to calculate an antenna synthesis weights for the newly detected radio signals to synthesize received signals provided from each antenna.

At this time, when an incoming time of the newly detected radio signal and an incoming time of a radio signal that a weight controller corresponding to antenna synthesis receiver 501*b* in profile estimator 506 has received are close, the despreading timing is close to an actual one.

Then profile estimator 506 provides the antenna synthesis weights, which is provided from second antenna receiver 501*b* as 520*b*3, to first antenna synthesis receiver 501*a* as 520*a*2. Antenna synthesis receiver 501*a* can start reception processing using weights close to an actual one by using weights 520*a*2 as the initial value, thereby making it possible to improve reception performance.

As described above, according to the fourth embodiment, it is possible to decrease an antenna's weight calculation time by comprising plural antennas 101, the first to n-th antenna synthesis receivers 501*a* to 501*d* for dividing received signals provided via plural antenna 101 according to the incoming time, calculating weights for the divided radio signal to synthesize the received signals provided via plural antennas 101, multiplying the received signals provided via plural antennas 101 by the calculated weights to synthesize, and profile estimator 506 for, in the case where a new radio signal is detected, updating the weights to synthesize the newly detected radio signal using the weights already calculated in the first to n-th antenna synthesis receivers 501*a* to 501*d* when an incoming time difference between an already detected radio signal and the newly detected radio signal is small.

Fifth Embodiment

Figure 8:
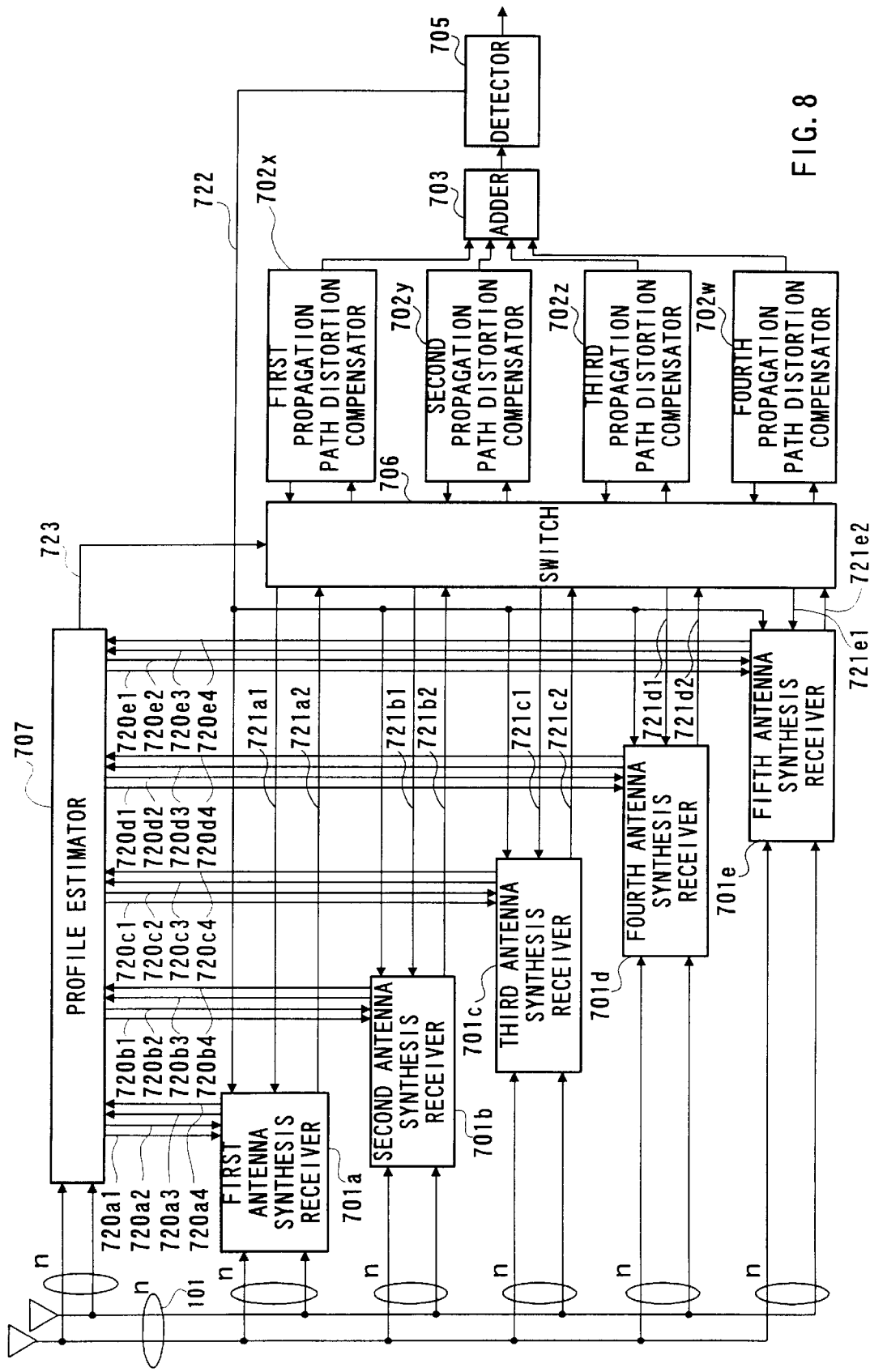
FIG. 8 is a block diagram illustrating a configuration of the data communication apparatus according to the fifth, sixth and seventh embodiments of the present invention.

FIG. 8 illustrates a block diagram of a data communication apparatus according to the fifth embodiment of the present invention. In addition, some sections in the fifth embodiment illustrated in FIG. 8 are assigned the same symbols as those of corresponding sections in the first embodiment illustrated in FIG. 2 and its explanation is omitted.

The data communication apparatus illustrated in FIG. 8 is primarily composed of plural antennas 101, first to fifth antenna synthesis receivers 701a, 701b, 701c, 701d and 701e respectively, first to fourth propagation path distortion compensators 702x, 702y, 702z and 702w respectively, adder 703, detector 705, profile estimator 707, and switch 706.

In the above constitution, first to fifth antenna synthesis receivers 701a to 701d have the same configuration. Hence the configuration is explained with reference to first antenna synthesis receiver 501a. An internal configuration of first antenna synthesis receiver 701a is the same as that of first antenna synthesis receiver 701 that is explained in the fourth embodiment with reference to FIG. 7, except for that channel quality information 620 output from channel quality estimator 607 illustrated in FIG. 7 is input to profile estimator 707 as 720a 4 illustrated in FIG. 8.

In other words, 520a1 illustrated in FIG. 7 corresponds to 720a1 illustrated in FIG. 8. In the same manner, 520a2, 520a3, 620 (already explained), 522, 521a1 and 521a2 correspond to respectively 720a2, 720a3, 720a4, 722, 721a1 and 721a2. Signals indicated by the other symbols in FIG. 8 are the same as those explained in the fourth embodiment.

In addition, the number of antenna synthesis receivers 701a to 701d is five in this embodiment, however it is preferable to apply more and less number than five.

Figure 3:
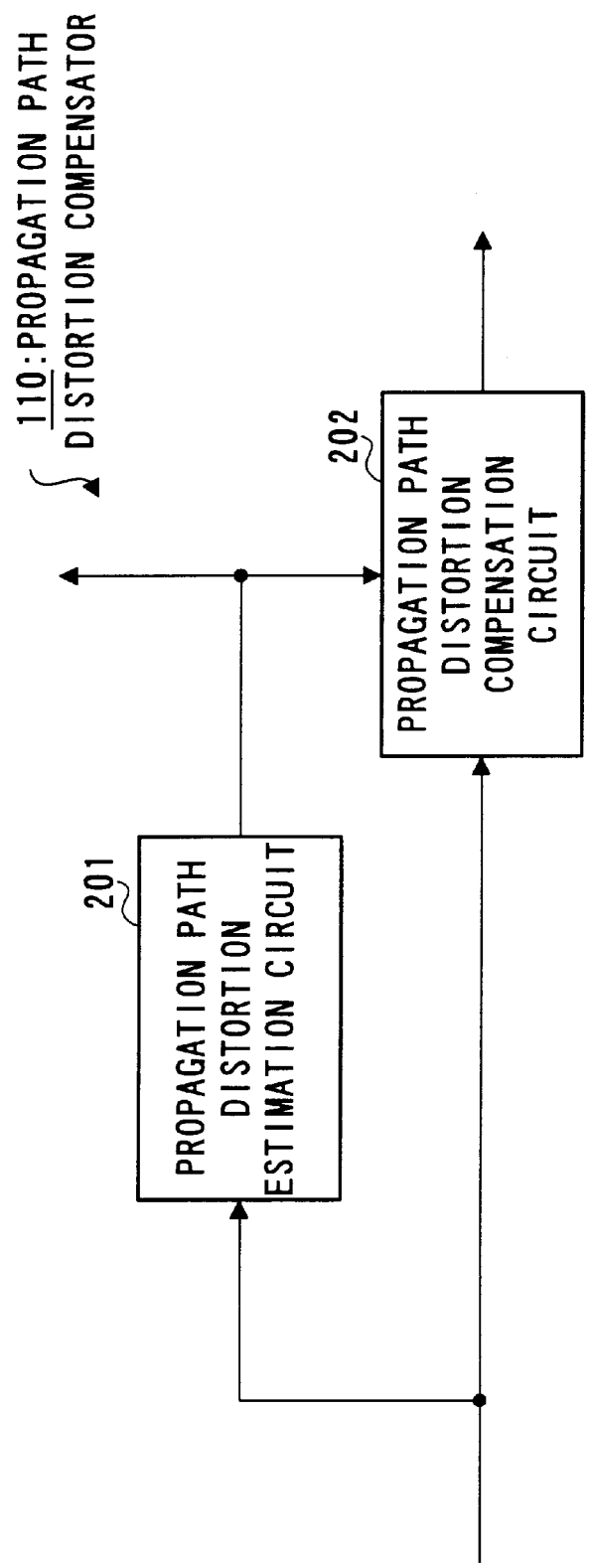
FIG. 3 is a block diagram illustrating a configuration of a propagation path distortion compensator of the data communication apparatus according to the first embodiment of the present invention.

A configuration of first propagation path distortion compensator 702x is the same as that illustrated in FIG. 3. That is, first propagation path distortion compensator 702x is composed of propagation path distortion estimation circuit 201 and propagation path distortion compensation circuit 202.

Propagation path distortion estimation circuit 201 estimates a propagation distortion of either of output signals 721a2 to 721d2 respectively from antenna synthesis receivers 701a to 701d selected by switch 706 according to signal 723 output from profile estimator 707.

Propagation path distortion compensation circuit 202 compensates the propagation path distortion estimated by propagation path distortion estimation circuit 201 to output to adder 703, and returns the propagation path distortion to antenna synthesis receivers 701a to 701d via switch 706. The processing of each of propagation path compensators 702y, 702z and 702w is the same as that of propagation path compensator 702x.

Adder 703 synthesizes each compensation result output from each of propagation path distortion compensators 702x to 702w to output to detector 705. Detector 705 detects the synthesis result output from adder 703 and outputs detection signal 722 to a reception signal processing circuit (not shown) and also to antenna synthesis receivers 701a to 701d as information to calculate the weights.

Profile estimator 707 estimates an incoming timing of radio signals based on received signals provided via plural antennas 101, calculates despreading timing data of each of antenna synthesis receivers 701a to 701e, and outputs the calculated despreading timing to each of antenna synthesis receivers 701a to 701e as 720b1, 720c1, 720d1 and 720e1 respectively. Also profile estimator 707 receives each antenna synthesis weights from each of antenna synthesis receivers 701a to 701d respectively as 720a3, 720b3, 720c3, 720d3 and 720e3 and receives the channel quality as 720a4, 720b4, 720c4, 720d4 and 720e4.

In addition, when a propagation path is changed, profile estimator 707 changes despreading timing of either of antenna synthesis receivers 701a to 701e in which the propagation path is changed. In this case, as described in the fourth embodiment, it is preferable, if any of antenna synthesis receivers 701a to 701e has despread at despreading timing close to that to be changed, to start updating the weights using the antenna's weights with that despreading timing as an initial value to reduce an estimation time for the weights. However it is also preferable not to perform the above processing.

Further, profile estimator 707 outputs signal 723 to switch 706. Signal 723 is generated based on channel quality information 720a4, 720b4, 720c4, 720d4 and 720e4 to instruct to switch 706 to assign radio signals received in each of antenna synthesis receivers 701a to 701e to each of propagation path distortion compensators 720x to 720w in order of higher channel quality of radio signals.

For example, when first antenna synthesis receivers 701a has received radio signals of which channel quality is the lowest among in radio signals of antenna synthesis receivers 701a to 701e, second antenna synthesis receiver 701b is connected to first propagation distortion compensator 702x, third antenna synthesis receiver 701c is connected to second propagation distortion compensator 702y, fourth antenna synthesis receiver 701d is connected to third propagation distortion compensator 702z, and fifth antenna synthesis receiver 701e is connected to fourth propagation distortion compensator 702w.

Since the channel quality is thus determined after the antenna's weights are multiplied, it is possible to estimate conditions of a propagation path more exactly. As a result, it is possible to improve reception performance.

As described above, according to the fifth embodiment, profile estimator 707 assigns input signals to each of antenna synthesis receivers 701a to 701e to each of propagation path distortion compensators 702x to 702w according to the order of higher channel quality of the input signals. It is thus possible to select radio signals corresponding to the channel quality of the radio signals that are used in an antenna weighting synthesis to synthesize when a plurality of incoming signals are synthesized. It is thereby possible to improve the reception performance as compared to the conventional technique and to reduce a hardware scale as compared to the data communication apparatus in the fourth embodiment.

Sixth Embodiment

The sixth embodiment is explained with reference to FIG. 8 as well as the fifth embodiment.

In the fifth embodiment, profile estimator 707 synthesizes different radio signals as many as possible using not only channel quality information 720a4, 720b4, 720c4, 720d4 and 720e4, but also antenna synthesis weights 720a3, 720b3, 720c3, 720d3, 720e3 and despreading timing 720a1 as a selection criterion in controlling switch 706.

For example, in the case of comparing channel qualities, since it is possible to predict the correlation of radio signals received in antenna synthesis receivers 701b or 701c is high if weights of 720b4 and 720c4 are close and despreading timings are also close even when 720a4 is the lowest, it is possible to select only higher channel quality and assign antenna synthesis receiver 701a to the last propagation path distortion compensator.

Profile estimator 707 thus operates, which makes it possible to select radio signals with no correlation of propagation path distortion, thereby allowing improving of reception performance. In addition, the number of antenna synthesis receivers or propagation path distortion compensators is not limited.

As described above, according to the sixth embodiment, it is possible to synthesize not only radio signals with different channel qualities but also radio signals with different weights to synthesize signals input from plural antennas 101. Since incoming radio signals from different directions are thus synthesized, it is possible to select radio signals with no correlation fading to synthesize. As a result, it is possible to improve the reception performance.

Seventh Embodiment

The seventh embodiment is explained with reference to FIG. 8 as well as the fifth embodiment.

In this embodiment, received signals provided via plural antennas 101 are divided according to the direction of arrival and time. In the fifth embodiment, antenna synthesis receivers 702x to 702w are provided for each direction of arrival and each despreading timing, and each output is provided to propagation path distortion compensators 702x to 702w.

Outputs from propagation path distortion compensators 702x to 702w are subjected to weighted synthesis corresponding to the channel quality. Or, in the same configuration as the sixth embodiment, antenna synthesis receivers 701a to 701e are provided for each direction of arrival and each despreading timing, and switch 706 is controlled so that signals are assigned to a propagation path distortion compensator according to the order of higher channel quality.

When antenna synthesis receivers 701a to 701e are capable of high-rate calculation, it is preferable to operate antenna synthesis receivers 701a to 701e in time division to reduce a circuit scale. It is possible to estimate more details of propagation conditions and to improve calculation assurance for antenna synthesis weights, which allows improving of the reception performance.

As described above, a data communication apparatus according to the seventh embodiment comprises a section for dividing received signals according to the incoming direction and time and a section for calculating weights to synthesize inputs from plural antennas for each divided radio signal, which makes it possible to divide radio signals according to the direction of arrival and time, and to perform weighted synthesis of radio signals in further detail, thereby allowing improving of reception performance.

Eighth Embodiment

In the eighth embodiment, the weights for antenna synthesis calculated according to either of the first embodiment to the seventh embodiment are multiplied to transmit from plural antennas. This processing improves reception performance of a partner side, thereby making it possible to improve the transmission performance as compared to a conventional data communication apparatus.

As described above, according to the eighth embodiment, since the weights to synthesize radio signals provided via plural antennas 101 are used to transmit weighted reception signals from plural antennas 101, it is possible to improve not only reception performance but also transmission performance.

As apparent from the above-description, according to the present invention, even in the case where the radio signal's direction of arrival changes rapidly, it is possible to receive radio signals without deteriorating reception performance. In other words, in the case where the channel quality deteriorates by a rapid change of the radio signal's direction of arrival, the second weight control section calculates in advance weights to be used after the channel quality deteriorates before multiplying received signals by weights to synthesize received signals provided via plural antennas. It is thereby possible to receive radio signals without deteriorating reception properties even in the case where the channel quality deteriorates due to the rapid change of the signal's direction of arrival.

Also it is possible to update weights to synthesize newly detected radio signals using the initial value, which makes it possible to reduce an antenna's weights calculation time.

Further, it is possible to improve not only reception performance but also reception performance by using weights to synthesize radio signals provided via plural antennas to transmit weighted transmission signals from plural antennas.

This application is based on the Japanese Patent Application No. HEI9-363616 filed on Dec. 16, 1997, entire content of which is expressly incorporated by reference herein.

What is claimed is:

1. A data communication apparatus comprising:

a plurality of antennas;

memorizing means for memorizing received signals provided via said plurality of antennas;

first weight controlling means for calculating first weights by which each of said received signals provided via said plurality of antennas is weighed to be synthesized;

second weight controlling means for calculating second weights using said received signals provided via said plurality of antennas;

multiplying means for multiplying each of said received signals provided via said plurality of antennas by said first weights, while multiplying each of said received signals provided via said plurality of antennas by said second weights, when a channel quality of a radio signal deteriorates;

adding means for synthesizing the multiplication result;

compensating means for estimating a deterioration of the channel quality of the radio signal, using the synthesis result to compensate for the deterioration; and detecting means for detecting the compensation result to output to a first weighing coefficient controlling means and said second weight controlling means as a parameter to calculate a first weighing coefficient and said second weights.

2. The data communication apparatus according to claim 1, wherein said compensating means estimates a distortion of a propagation path of the radio signal to compensate.

3. The data communication apparatus according to claim 1, wherein said second weights controlling means operates to calculate the weights when the channel quality of the radio signal deteriorates.

4. The data communication apparatus according to claim 1, wherein while one of said first weighing coefficient controlling means or said second weight controlling means operates, the other one of said first weighing coefficient controlling means or said second weight controlling means suspends an operation.

5. The data communication apparatus according to claim 1, wherein in said memorizing means, a predetermined number of slots of said received signals provided via said plurality of antennas are memorized according to an order of inputting, and output to said first weight controlling means according to an order of memorizing.

6. The data communication apparatus according to claim 1, wherein said first weighing coefficient controlling means and said second weight controlling means estimate the radio signal's direction of arrival of said received signals provided via said plurality of antennas by calculating the weighing coefficient.

7. The data communication apparatus according to claim 1, wherein said multiplying means multiplies a transmission signal by at least one of said first and second weights to synthesize the received signals provided via the plurality of antennas, the apparatus further comprising transmission means for transmitting said multiplied transmission signal from the plurality of antennas.

8. The data communication apparatus according to claim 1, wherein said second weight controlling means is configured to calculate the second weights to be used after a change in direction of arrival of the radio signal, before said adding means synthesizes the multiplication result.

9. A data communication apparatus comprising:
  a plurality of antennas;
  memorizing means for memorizing received signals provided via said plurality of antennas;
  weight controlling means for calculating first weights by which each of said received signals provided via said plurality of antennas is weighed to be synthesized, while when a channel quality of a radio signal deteriorates, suspending to calculate said first weights, and calculating second weights, using said received signals provided via said plurality of antennas;
  multiplying means for multiplying each of the memorized received signals by said first weights, while when the channel quality of the radio signal deteriorates, multiplying each of said received signals provided via said plurality of antennas by said second weights;
  adding means for synthesizing the multiplication result;
  compensating means for estimating a deterioration of the channel quality of the radio signal, using the synthesis result to compensate for the deterioration; and
  detecting means for detecting the compensation result to output to a weighing coefficient controlling means as a parameter to calculate a first weighing coefficient and said second weights.

10. The data communication apparatus according to claim 9, wherein in the case where it is decided that said weight controlling means has a further ability to calculate the weights, said weight controlling means calculates said first weights and said second weighting coefficient.

11. The data communication apparatus according to claim 9, wherein in the case where it is decided that said weight controlling means does not have a further ability to calculate weights, said weight controlling means calculates said first weighting coefficient in a first half of a received signal slot that is a unit for a weight calculation, and calculates said second weights in a latter half of the received signal slot.

12. The data communication apparatus according to claim 9, wherein said weight controlling means is configured to calculate the second weights to be used after a change in direction of arrival of the radio signal, before said adding means synthesizes the multiplication result.

13. A data communication apparatus comprising:
  a plurality of antennas;
  a plurality of antenna synthesis receiving means for dividing received signals provided via said plurality of antennas according to a difference of incoming time, calculating weights to synthesize the divided received signal and multiplying said divided received signal by a calculated weighing coefficient to synthesize the divided received signal;
  profile estimating means for newly detecting a received signal provided via said plurality of antennas, said profile estimating means having an output coupled to the data communication apparatus;
  weight controlling means for updating the weights to synthesize the newly detected received signal using the weights already calculated at said plurality of antenna synthesis receiving means as an initial value when an incoming time of said newly detected received signal is close to that of an already detected received signal;
  a plurality of compensating means for estimating a deterioration of a channel quality of a radio signal using the synthesis result by said plurality of antenna synthesis receiving means to compensate for the deterioration;
  adding means for synthesizing the compensated result by said plurality of compensating means; and
  detecting means for detecting the synthesis result by said adding means to output to said plurality of antenna synthesis receiving means as a parameter to calculate said weights.

14. The data communication apparatus according to claim 13, wherein said plurality of antenna synthesis receiving means comprise channel quality estimating means for determining a channel quality of a radio signal using the synthesis result of a multiplication of the received signal divided according to incoming time by the weights.

15. The data communication apparatus according to claim 14, wherein the profile estimating means assigns the received signals provided from the plurality of antenna synthesis receiving means to the plurality of compensating means according to a higher order of channel quality based on channel quality information from said channel quality estimating means.

16. The data communication apparatus according to claim 14, the profile estimating means assigns the received signals provided from the plurality of antenna synthesis receiving means to the plurality of compensating means so that radio signals having different weights to synthesize received signals provided via the plurality of antennas along with different channel quality information are synthesized.

17. The data communication apparatus according to claim 14, wherein the plurality of antenna synthesis receiving means divide received signals according to an incoming direction and incoming time, and calculates a weights for each divided radio signal to synthesize the received signals provided via said plurality of antennas.

18. The data communication apparatus according to claim 13, wherein said weight controlling means is configured to calculate the weights to be used after a change in direction of arrival of the radio signal, before said adding means synthesizes the compensated result.

19. A data communication method comprising:
  memorizing received signals provided via a plurality of antennas;

calculating first weights by which each of said received signals provided via said plurality of antennas is weighed to be synthesized;

calculating second weights using said received signals provided via said plurality of antennas;

multiplying each of said received signals provided via said plurality of antennas by said first weights, while when a channel quality of a radio signal deteriorates, multiplying each of said received signals provided via said plurality of antennas by said second weights;

synthesizing the multiplication result;

estimating a deterioration of the channel quality of the radio signal using the synthesis result to compensate for the deterioration; and detecting the compensation result to output to said a weighing coefficient controlling means and a second weight controlling means as a parameter to calculate a first weighing coefficient and said second weights.

20. The data communication method according to claim 19, wherein said second weights are calculated when the channel quality of the radio signal deteriorates.

21. The data communication method according to claim 19, wherein while one of said first weighing coefficient or said second weights are calculated, the other one of said first weighing coefficient or said second weights are not calculated.

22. The data communication method according to claim 19, wherein a predetermined number of slots of said received signals are memorized according to an order of inputting when the received signals provided via said plurality of antennas are memorized, and said first weights are calculated according to an order of the memorizing.

23. The data communication method according to claim 19, wherein the said received signal's direction of arrival direction provided via said plurality of antennas is estimated by calculating said first weighing coefficient and said second weights.

24. The data communication method according to claim 19, wherein said method further comprises:

multiplying a transmission signal by at least one of the first and second weights to synthesize the received signals provided via the plurality of antennas; and transmitting the multiplied transmission signal from said plurality of antennas.

25. The data communication method according to claim 19, further comprising calculating the second weights to be used after a change in direction of arrival of the radio signal, before said synthesizing.

26. A data communication method comprising:

dividing received signals provided via the plurality of antennas according to a difference of incoming time;

calculating the weights to synthesize the divided received signal;

multiplying said divided received signal by a calculated weighing coefficient to synthesize the divided received signal;

detecting a newly received signal provided via said plurality of antennas;

updating weights to synthesize the newly received signal using the weights that are already calculated at said plurality of antenna synthesis receiving means as an initial value when incoming time of said newly received signal is close to that of an already detected received signal;

estimating a deterioration of a channel quality of a radio signal using the synthesis result to compensate for the deterioration;

synthesizing the compensated result; and detecting the synthesis result to use as a parameter to calculate said weights.

27. The data communication method according to claim 26, wherein said method further comprises the step of determining a channel quality of a radio signal using the synthesis result of a multiplication of the divided received signal according to an incoming time by the weights.

28. The data communication method according to claim 27, wherein said method further comprises the step of estimating a deterioration of the channel quality in the received signals provided via the plurality of antennas to compensate according to a higher order of channel quality in the received signals.

29. The data communication method according to claim 27, wherein said method further comprises the step of synthesizing radio signals having different weights to synthesize received signals provided via the plurality of antennas along with different channel quality information.

30. The data communication method according to claim 26, wherein said method further comprises the steps of dividing received signals according to an incoming direction and incoming time, and of calculating the weights for each divided radio signal to synthesize the received signals provided via the plurality of antennas.

31. The data communication method according to claim 26 further comprising calculating the weights to be used after a change in direction of arrival of the radio signal, before said synthesizing.

* * * * *

UNITED STATES PATENT AND TRADEMARK OFFICE
CERTIFICATE OF CORRECTION

PATENT NO. : 6,191,736 B1
DATED : February 20, 2001
INVENTOR(S) : H. Yukitomo et al.

It is certified that error appears in the above-identified patent and that said Letters Patent is hereby corrected as shown below:

Title page,
Item [57] line 11, after "arrival" insert --- . ---.

Signed and Sealed this

Twenty-seventh Day of November, 2001

Attest:

NICHOLAS P. GODICI
Attesting Officer
Acting Director of the United States Patent and Trademark Office